(12) United States Patent
Meyer (10) Patent No.: US 9,234,407 B2
(45) Date of Patent: Jan. 12, 2016

(54) PROCESS FOR SIMULTANEOUSLY EXTRACTING AND UPGRADING BY CONTROLLED EXTRACTION A HEAVY HYDROCARBON MIXTURE

(75) Inventor: Trygve Meyer, Stavanger (NO)

(73) Assignee: STATOIL PETROLEUM AS, Stavanger (NO)

( * ) Notice: Subject to any disclaimer, the term of this patent is extended or adjusted under 35 U.S.C. 154(b) by 446 days.

(21) Appl. No.: 13/384,053

(22) PCT Filed: Jul. 14, 2010

(86) PCT No.: PCT/GB2010/051153
§ 371 (c)(1),
(2), (4) Date: Mar. 15, 2012

(87) PCT Pub. No.: WO2011/007172
PCT Pub. Date: Jan. 20, 2011

(65) Prior Publication Data
US 2012/0160737 A1    Jun. 28, 2012

(30) Foreign Application Priority Data

Jul. 14, 2009    (GB) .................................. 0912255.7

(51) Int. Cl.
*C09K 8/594* (2006.01)
*E21B 41/00* (2006.01)
*E21B 43/16* (2006.01)

(52) U.S. Cl.
CPC ........... *E21B 41/0064* (2013.01); *E21B 43/164* (2013.01); *Y02C 10/14* (2013.01)

(58) Field of Classification Search
CPC ....... E21B 43/164; C09K 8/592; C09K 8/594
USPC ................... 166/268, 400, 401, 402; 507/202
See application file for complete search history.

(56) References Cited

U.S. PATENT DOCUMENTS 4,446,921 A     5/1984   Coenen et al.
4,483,761 A *  11/1984   Paspek, Jr. .................... 208/106
(Continued)

FOREIGN PATENT DOCUMENTS

CA          2590829 A1    12/2007
CA          2599553 A1     2/2008
(Continued)

OTHER PUBLICATIONS

International Preliminary Report on Patentability and Written Opinion of the International Searching Authority, mailed Jan. 26, 2012 in PCT/GB2010/051153.
(Continued)

*Primary Examiner* — Ellen McAvoy
(74) *Attorney, Agent, or Firm* — Birch, Stewart, Kolasch & Birch, LLP (57) ABSTRACT

The present invention provides a process for simultaneously extracting and upgrading a heavy hydrocarbon mixture, said process comprising: i) injecting supercritical or near-supercritical $CO_2$ at a temperature of around the critical temperature and a pressure of from around the critical pressure into a heavy hydrocarbon deposit; and ii) removing a stream of $CO_2$ from the deposit, which stream is charged with a hydrocarbon mixture having a lower average molecular weight than that of the heavy hydrocarbon deposit, wherein the removed $CO_2$ is optionally recovered and either recycled for subsequent re-injection or injected for long-term sub-surface storage.

12 Claims, 5 Drawing Sheets (56) References Cited

U.S. PATENT DOCUMENTS

| | | | |
|---|---|---|---|
| 4,532,992 A * | 8/1985 | Coenen et al. | 166/267 |
| 4,609,043 A | 9/1986 | Cullick | |
| 5,024,276 A * | 6/1991 | Borchardt | 166/308.6 |
| 5,117,907 A * | 6/1992 | Hsu | 166/266 |
| 5,358,046 A | 10/1994 | Sydansk et al. | |
| 5,496,464 A * | 3/1996 | Piskorz et al. | 208/108 |
| 7,562,708 B2 * | 7/2009 | Cogliandro et al. | 166/248 |
| 7,730,958 B2 * | 6/2010 | Smith | 166/402 |
| 7,770,642 B2 * | 8/2010 | Dahanayake et al. | 166/270.1 |
| 7,789,164 B2 * | 9/2010 | Looney et al. | 166/402 |
| 8,091,636 B2 * | 1/2012 | Kuhlman | 166/272.3 |
| 8,372,347 B2 * | 2/2013 | Berkowitz et al. | 422/198 |
| 2007/0137852 A1 | 6/2007 | Considine et al. | |
| 2007/0261844 A1 | 11/2007 | Cogliandro et al. | |
| 2010/0200229 A1 * | 8/2010 | Jefferd | 166/272.2 |
| 2010/0270038 A1 * | 10/2010 | Looney et al. | 166/402 |
| 2011/0049016 A1 * | 3/2011 | McGrady et al. | 208/390 |
| 2011/0114340 A1 * | 5/2011 | Segerstrom | 166/402 |
| 2012/0067568 A1 * | 3/2012 | Palmer et al. | 166/256 |

FOREIGN PATENT DOCUMENTS

| | | |
|---|---|---|
| DE | 819 386 C | 10/1951 |
| GB | 669216 A | 3/1952 |
| GB | 2104132 A | 3/1983 |
| WO | WO 2007/018844 A2 | 2/2007 |
| WO | WO 2007/100733 A2 | 9/2007 |
| WO | WO 2008/070035 A2 | 6/2008 |
| WO | WO 2011/007172 A2 | 1/2011 |

OTHER PUBLICATIONS

International Search Report, dated Mar. 21, 2011 in PCT/GB2010/051153.

"Petroleum Technology Transfer Council, PTTC, CO2 flooding increases recovery," 1997 and 1998, http://www.pttc.org/solutions/12.htm.

Bachu et al., "Estimation of Oil Recovery and CO2 Storage Capacity in CO2 EOR Incorporating the Effect of Underlying Aquifers," SPE 89340, Society of Petroleum Engineers, SPE/DOE Symposium on Improved Oil Recovery, Tulsa, Oklahoma, Apr. 17-21, 2004, pp. 1-13.

ECL Technology Ltd., "Effect of Impure CO2 on Miscibility Under UKCS Conditions," DTI SHARP Website—CO2 Dissemination, Report 14, Based on a report by AEA Technology plc (now ECL Technology Ltd) for the DTI, May 2002, 25 pages.

Gozalpour et al., "CO2 EOR and Storage in Oil Reservoirs," Oil & Gas Science and Technology—Rev. IFP, vol. 60, 2005, No. 3, pp. 537-546.

Grigg et al., "Improved Efficiency of Miscible CO2 Floods and Enhanced Prospects for CO2 Flooding Heterogeneous Reservoirs," PRRC 98-29, Annual Report for the period Jun. 1, 1997 through May 31, 1998, Jul. 1998, pp. i-xii and 1-125 (136 pages total).

Hadlow, "Update of Industry Experience with CO2 Injection," SPE 24928, Society of Petroleum Engineers, SPE 67th Annual Technical Conference and Exhibition, Washington, D.C., Oct. 4-7, 1992, pp. 743-752.

Holm et al., "Mechanisms of Oil Displacement by Carbon Dioxide," SPE 4736, Journal of Petroleum Technology, Dec. 1974, pp. 1427-1438.

Lako, "Options for CO2 sequestration and enhanced fuel supply, Monograph in the framework of the VLEEM project," Energy Research Center of the Netherlands ECN, Apr. 2002, pp. 1-75.

Law, "Disposal of Carbon Dioxide, a Greenhouse Gas, for Pressure Maintenance in a Steam-Based Thermal...," Society of Petroleum Engineers, SPE 86958, International Thermal Operations and Heavy Oil Symposium and Western Regional Meeting, Bakersfield, California, Mar. 16-18, 2004, pp. 1-14.

Nelms et al., "Evaluation of Oil Reservoir Characteristics to Assess North Dakota Carbon Dioxide Miscible Flooding Potential," 12th Williston Basin Horizontal Well and Petroleum Conference, Minot, North Dakota, May 2-4, 2004, 11 pages.

Novosad et al., "Experimental and Modeling Studies of Asphaltene Equilibria for a Reservoir Under CO2 Injection," SPE 20530, Society of Petroleum Engineers, SPE 65th Annual Technical Conference and Exhibition, New Orleans, Louisiana, Sep. 23-26, 1990, pp. 599-607.

Oskouie et al., "Mechanisms of Oil Recovery by Non-hydrocarbon Gas Injection," Chemical Engineering Faculty of Sahand University of Technology, Tabriz, Iran, Published by: Buduka Kurata Stanley on Feb. 14, 2014, 8 pages.

Picha, "Enhanced Oil Recovery by Hot CO2 Flooding," SPE 105425, 15th SPE Middle Oil & Gas Show and Conference held in Bahrain International Exhibition Centre, Kingdom of Bahrain, Mar. 11-14, 2007, 5 pages.

Rose et al., "Fractionation of Peace River Bitumen Using Supercritical Ethane and Carbon Dioxide," Industrial & Engineering Chemistry Research, vol. 39, No. 10, 2000 (Published on web: Sep. 9, 2000), pp. 3875-3883.

Shaw et al., "Screening, Evaluation, and Ranking of Oil Reservoirs Suitable for CO2-Flood EOR and Carbon Dioxide Sequestration," Journal of Canadian Petroleum Technology, vol. 41, No. 9, Sep. 2002, pp. 51-61.

Talbi et al., "Evaluation of CO2 Based Vapex Process for the Recovery of Bitumen from Tar Sand Reservoirs," SPE 84868, Society of Petroleum Engineers, SPE International Improved Oil Recovery Conference in Asia Pacific, Kuala Lumpur, Malaysia, Oct. 20-21, 2003, pp. 1-9.

Yuan et al., "Mineral Scale Control in a CO2 Flooded Oilfield," SPE 65029, SPE International Symposium on Oilfield Chemistry, Houston, Texas, Feb. 13-16, 2001, pp. 1-7.

* cited by examiner

PROCESS FOR SIMULTANEOUSLY EXTRACTING AND UPGRADING BY CONTROLLED EXTRACTION A HEAVY HYDROCARBON MIXTURE

This invention relates to a process for the simultaneous recovery of hydrocarbons and upgrading of heavy hydrocarbons, especially from submarine reservoirs, using carbon dioxide at temperatures around the critical temperature. In particular, the process of the invention provides a partially-refined oil with improved characteristics (e.g. lower viscosity and improved refinery yield structure) from the heavy hydrocarbons in the reservoir.

Heavy hydrocarbons, e.g. heavy and extra heavy oils and bitumen, are conventionally defined as hydrocarbons with an American Petroleum Institute (API) gravity of less than 25 degrees, especially less than 20 degrees, and are believed to result from lighter crude oils being degraded through exposure to bacteria and water at temperatures below 80° C.; resulting in the loss of the lighter fractions while leaving behind the heavier and more naphthenic/aromatic fractions in the reservoir.

Heavy hydrocarbons represent a huge natural resource of the world's total potential reserves of oil. Present estimates place the quantity of heavy hydrocarbons reserves at several trillion barrels, more than 5 times the known amount of the conventional, i.e. non-heavy, hydrocarbon reserves. However, heavy to extra heavy hydrocarbon reserves are generally difficult or impossible to recover and process by conventional means, the hydrocarbons being characterised by very high viscosities and low API (American Petroleum Institute) gravity as well as high levels of unwanted components such as asphaltenes, trace metals and sulphur.

As an added disadvantage, higher volumes of hydrogen are required during upgrading of heavy hydrocarbons to produce products for the market, especially for the automotive market. Furthermore, the ecological impact of recovering and refining heavy hydrocarbon mixtures can be very heavy, especially where shallow-well reserves are utilised.

Methods have been developed to recover and process heavy hydrocarbon mixtures. Enhanced Oil Recovery (EOR) techniques such as steam injection and Steam Assisted Gravity Drainage (SAGD) are known for the purpose of recovery from shallow, onshore reservoirs. Displacement of lighter and conventional oils using gas injection is also known. Here, gas such as carbon dioxide ($CO_2$), natural gas or nitrogen is injected into the reservoir, whereupon it expands and pushes additional oil to a production well. The injected gas can also dissolve in the oil to lower its viscosity and improve its flow rate.

Off-shore extraction and processing, especially upgrading, of heavy hydrocarbons from submarine reservoirs poses a particular problem, since the capacity for energy production, material transfer and processing, solvent handling etc. are significantly reduced relative to an on-shore facility. The limited space available on off-shore facilities coupled with their stringent safety requirements leads to particularly acute problems when dealing with heavy and viscous hydrocarbon deposits.

A further problem with the heavy and extra heavy oils obtained from heavy hydrocarbon reservoirs is the need to improve their flowability through partial upgrading the oils before transportation by pipeline or ship to a conventional refinery. The transportability of viscous heavy oils is conventionally improved by dilution with a lighter hydrocarbon such as naphtha, a very light crude oil or a condensate. However, the need to transport a diluent to the extraction/production site or to transport the heavy oil to an upgrading facility or refinery represents a significant disadvantage of the conventional processes. This problem becomes particularly acute for off-shore activities.

Alternatively, the extracted heavy hydrocarbon mixture may be partially or fully refined or upgraded on-site, e.g. using a processing plant located close to the production well. Some processes known in the art use water (or other hydrogen-containing materials) in the supercritical state for the upgrading, e.g. cracking and/or reforming, of heavy hydrocarbon mixtures. However, these processes usually require specialist equipment such as high pressure and high temperature reactors which are expensive to acquire and maintain, especially on off shore platforms.

The supercritical fluid state describes the state of a substance in a non-solid state when at a temperature and pressure at or above its critical point. The critical point describes the endpoint of the liquid-vapour coexistence line on the phase diagram for that substance; for carbon dioxide the critical point occurs at a temperature of 31.1° C. (304.1 K) and a pressure of 72.8 atm (7.39 MPa). Supercritical fluids are known to have interesting properties, for example they have high diffusion rates and low viscosities and they can act as powerful solvents.

A number of supercritical fluids have been suggested or investigated for potential use as solvents for extracting hydrocarbons over the years. U.S. Pat. No. 4,532,992, filed in 1982, proposed the use of a supercritical gas for recovering petroleum from a deposit which has already been worked by primary extraction, or which is not suitable for primary extraction, by a process comprising introducing a gas in its critical state into the deposit at a temperature of between 10° C. and 100° C. above the critical temperature of said gas and at a pressure of between 2 and 350 bar above the critical pressure of said gas. The charged gas (i.e. gas plus petroleum) is to be removed from the deposit in the supercritical state and the petroleum is separated from the supercritical gas into at least two separate fractions by stepwise pressure reduction and/or changes in temperature. The process of U.S. Pat. No. 4,532,992 is not directed particularly towards the extraction of hydrocarbons with a low API gravity. It is also not directed at extraction from submarine deposits at off shore sites since it advocates the use of gases under conditions far exceeding their critical points whereas such conditions are expensive and difficult to achive off shore.

More recently, interest in supercritical gas extraction has focussed on a number of solvents for use in the supercritical extraction of heavy hydrocarbons. Propane, ethane, ethene and $CO_2$ have all been proposed for use. It is currently believed that supercritical ethane markedly outperforms $CO_2$ as a solvent for the processing of complex hydrocarbon mixtures such as bitumens and heavy oils (Rose et al., *Ind. Eng. Chem. Res.*, 2000, 39, 3875-3883).

Where $CO_2$ is concerned, it is currently thought that injection of hot $CO_2$, i.e. $CO_2$ at a temperature significantly above the critical temperature, for example a temperature in the region of 150° C., is optimal for the extraction of heavy hydrocarbons. This process has been termed "Hot $CO_2$ Flooding". However, the use of hot $CO_2$ is limited due to the corrosive nature of the hot gas. This makes hot $CO_2$ flooding processes especially unsuitable for off-shore use.

Despite recent advances in the field of heavy hydrocarbon recovery and processing, there still exists an acute need for a commercially-viable process for refining and upgrading heavy hydrocarbon mixtures in a cheap, quick and as environmentally-clean as possible fashion. In particular, a process which offers economy of scale and reduces the need for surface upgrading or refining is needed to enable deep submarine deposits of heavy hydrocarbons to be better exploited.

The present inventors have devised such a process which allows for the combined extraction and partial upgrading of heavy hydrocarbon mixtures, even from such submarine deposits. In particular, the inventors have found that supercritical $CO_2$ is a surprisingly versatile solvent and that the resulting composition of an upgraded oil can be controlled to an unexpected degree by varying the extraction conditions.

Accordingly, in a first aspect the invention provides a process for simultaneously extracting and upgrading a heavy hydrocarbon mixture, said process comprising:

i) injecting supercritical or near-supercritical $CO_2$ at a temperature of around the critical temperature and a pressure of from around the critical pressure into a heavy hydrocarbon deposit; and ii) removing a stream of $CO_2$ from the deposit, which stream is charged with a hydrocarbon mixture having a lower average molecular weight than that of the heavy hydrocarbon deposit, wherein the removed $CO_2$ is optionally recovered and either recycled for subsequent re-injection or injected for long-term sub-surface storage.

In a preferred process of the invention the heavy hydrocarbon mixture is present in a deposit located in an off shore reservoir. Preferably the reservoir has already been subjected to primary extraction or is unsuitable for primary extraction.

One advantage of the present invention is that the heavy hydrocarbon mixture from the deposit is extracted and partially upgraded in a single operation. The flow of $CO_2$ through the deposit serves to "push" the hydrocarbon to the surface and the simultaneous extraction of hydrocarbon into the $CO_2$ achieves upgrading. The lighter fractions of hydrocarbon are extracted with an increasingly heavy residue being left in the deposit. The inventors have surprisingly found that the process of the invention provides a selectively upgraded oil (the extracted hydrocarbon mixture) with a lighter refinery structure and a higher API gravity than the hydrocarbon mixture of the deposit. Unless otherwise indicated, the term "extracted hydrocarbon mixture" refers to all of the hydrocarbyl components contained within the $CO_2$ stream when it reaches the surface, i.e. at the point of extraction.

The process of the invention is therefore particularly attractive as it facilitates a controllable extraction of a desirable hydrocarbon mixture. Thus the conditions under which the extraction process is carried out can be manipulated to ensure that the extracted hydrocarbon mixture has, for example, a higher API gravity and/or a lower amount of asphaltenes relative to the heavy hydrocarbon mixture present in the deposit.

A further advantage of the present invention is that unwanted extra-heavy components (e.g. asphaltenes) and polar components are retained within the deposit and only the upgraded hydrocarbon mixture is extracted. Lower quantities of extra-heavy and polar components as well as trace metals and sulphur in the product stream result in fewer problems with water emulsions and increased viscosity of the product stream on separation of the hydrocarbon from the $CO_2$ solvent and render the down-stream processes cheaper and more efficient.

In a preferred embodiment of the invention, the hydrocarbon mixture with which the $CO_2$ stream is charged has an increased yield of components up to about 375° C. and a decreased yield of components over 375° C., e.g. at 525° C., e.g. relative to the heavy hydrocarbon mixture present in the deposit. This equates roughly to an increased proportion of $C_{2-24}$ hydrocarbons and a decreased proportion of $C_{25+}$ hydrocarbons, e.g. relative to the heavy hydrocarbon mixture present in the deposit. In particular, the hydrocarbon mixture has properties and qualities as hereinafter defined.

In a preferred embodiment the extracted hydrocarbon mixture, when separated from the $CO_2$ stream, is pumpable, e.g. it has a sufficiently low density and viscosity (e.g. at conditions around ambient conditions) to flow along a pipeline. The extracted hydrocarbon mixture is especially a hydrocarbon mixture which requires little, e.g. essentially no, additional solvent to be added in order to render the mixture pumpable. Preferably the extracted hydrocarbon mixture does not require the addition of any diluent to render the mixture pumpable, e.g. with conventional equipment.

It has also been surprisingly found that the process of the invention typically yields an extracted hydrocarbon mixture with reduced catalyst poisoning components, thereby making it more suitable for catalytic upgrading. It is believed that the catalyst poisoning components are preferentially retained in the heavy residue which is left behind in the reservoir. Further advantages of the invention include the production of an extracted hydrocarbon mixture which is less contaminated with toxic solvent residues; and the ability to extract thermally labile compounds from the heavy hydrocarbon deposit without damage owing to the relatively low temperatures that are employed.

In addition, the $CO_2$ used and produced during the process can be captured and either re-injected in step (i) of the above process, or it can be injected into the production reservoir for EOR purposes and/or for carbon dioxide sequestration. Preferably at least some of the $CO_2$ is re-injected in step (i). Thus typically the $CO_2$ is captured, optionally purified, and re-compressed to the supercritical or near supercritical state.

The terms "upgrading" and "refining" are well known to the person of skill in the art. "Upgrading" generally refers to the process of altering a hydrocarbon mixture to have more desirable properties, e.g. to providing lighter, synthetic crude oils from heavier oils by hydrogen addition. "Refining" encompasses the processes of separation and purification by distillation and fractionation, as well as reforming and cracking.

By "hydrocarbon mixture" is meant a combination of various types of molecules that contain carbon atoms, some with hydrogen atoms attached. It is understood that a hydrocarbon mixture may comprise a large number of molecular species having a wide range of molecular weights. Heavy oils according to the invention will also typically include atoms besides hydrogen and carbon, such as sulphur, nitrogen and oxygen, as well as metals such as iron, nickel and vanadium in the heavier parts of the mixture. Generally, at least 90% by weight of the hydrocarbon mixture consists of carbon and hydrogen atoms.

Heavy hydrocarbon mixtures of the invention are especially those which have an API gravity of less than about 25 (degrees), preferably of less than about 22, e.g. less than about 15 or 12. It is particularly preferred that the API gravity of the heavy hydrocarbon mixture is from between about 8 and about 25, e.g. between about 10 and 20 or between about 12 and 15. Especially preferred heavy hydrocarbon mixtures of the invention have an API gravity of about 22, about 19, about 13 or about 9.

The term "heavy hydrocarbon mixture" according to the present invention would be understood by the skilled person. Heavy crude oil, extra heavy oil and bitumen are examples of heavy hydrocarbon sources. Terms such as "light", "lighter", "heavier" etc. are to be interpreted relative to "heavy". At a given pressure and temperature, the present inventors propose that supercritical $CO_2$ will extract the same type of components from two different heavy hydrocarbon sources, but that the total recovery (percent recovery by weight of the total oil in place) will be higher from the lighter of the two sources. The processes of the invention are therefore particularly suitable for heavy hydrocarbon mixtures having an API gravity between 10 and 20 degrees, where viscosity, flowability and water in oil emulsions are matters of concern. This category of heavy hydrocarbon mixture tends to comprise significant amounts of aromatic and napthalenic compounds that form emulsions during water flooding operations making hydrocarbon recovery therefrom highly problematic.

The term "supercritical" has particular meaning in the art, i.e. within the area of the phase diagram beyond the critical point of the substance in question. In the present context the term "supercritical" is also used to denote the near-supercritical state, i.e. the state sufficiently close to the supercritical state that the substance possesses useful properties which are particularly characteristic of the supercritical state. Examples of such properties are density, viscosity and solubility.

Accordingly, the term "around the critical temperature" refers to a temperature whereby the $CO_2$ is in the supercritical (or near-supercritical) state. In one embodiment of the invention the temperature (T) of the injected supercritical $CO_2$ is slightly below the critical temperature. In a more preferred embodiment, the temperature is at or slightly above the critical temperature.

When injected into the hydrocarbon deposit the $CO_2$ may or may not be in the supercritical state. If the $CO_2$ is not in the supercritical state at the time of injection, the conditions in the reservoir (i.e. pressure and/or temperature) will convert it into the supercritical state. Preferably the $CO_2$ is in the supercritical state at the time of injection.

The optimal ranges of temperature and pressure for a selective hydrocarbon recovery process to take place will depend on the heavy hydrocarbon mixture quality as well as the subsurface reservoir conditions (e.g. pressure and temperature). These in situ (i.e. reservoir) conditions set the minimum depth below the surface (or sea bed) for a potential hydrocarbon reservoir source if the $CO_2$ is not significantly heated or pressurised on injection. Generally the reservoir temperature increases as the depth below the surface (or sea bed) increases and simultaneously the reservoir pressure increases. Thus there will typically exist a range of reservoir depths within which the supercriticial or near supercritical state of $CO_2$ can readily be maintained. These are typically the depths from which heavy hydrocarbon can be recovered using the extraction processes of the present invention. Thus when it is stated herein that the reservoir conditions should have certain conditions (e.g. pressure and/or temperature), it is meant that the reservoir at the depth where extraction occurs should possess those conditions. The range of depths from which heavy hydrocarbon can be recovered can, however, be increased by, e.g. injecting the $CO_2$ into the deposit under pressure.

Preferably reservoirs for use of supercritical $CO_2$ extraction processes according to the invention have pressure and temperature conditions corresponding to or exceeding the critical point for $CO_2$. Particularly preferably the reservoir for use of supercritical $CO_2$ extraction processes according to the invention has a temperature of 31.1° C. or greater. Particularly preferably the reservoir for use of supercritical $CO_2$ extraction processes according to the invention has a pressure of 72.8 atm or greater. Especially preferably the reservoir for use of supercritical $CO_2$ extraction processes according to the invention has a temperature of 31.1° C. or greater and a pressure of 72.8 atm of greater.

For offshore application of supercritical $CO_2$ according to the processes of the invention, the temperature relates to the geothermal gradient down through the sediments in a reservoir and the pressure depends also on a gradient based on the water column as well as the lithostratigraphic pressure at the given reservoir depth. Thus, reservoirs above (i.e. less deep than) a depth having conditions corresponding to the critical point for $CO_2$ are less preferred for use of supercritical $CO_2$ extraction processes according to the invention. Correspondingly reservoirs below a depth having conditions corresponding to the critical point for $CO_2$ are more preferred for use of supercritical $CO_2$ extraction processes according to the invention.

In situ temperatures and pressures are anti-correlating factors which affect the density and extraction capability of $CO_2$ in the supercritical state. The reservoir temperature is only practicably adjustable by injection of large volumes of heated or cooled fluid (e.g. $CO_2$), which is not viable for offshore applications. Thus, modulation of the $CO_2$ pressure is preferred for tuning the profile of extracted hydrocarbon from subsurface hydrocarbon reservoirs, especially submarine reservoirs, in processes according to the invention.

In a preferred embodiment, supercritical $CO_2$ is injected into a heavy hydrocarbon deposit wherein the in situ conditions of said deposit are a temperature of between about 25° C. and 120° C., preferably between about 31° C. and 100° C., more preferably between about 35° C. and 60° C.; and a pressure of greater than about 7 MPa, e.g. greater than about 8 or 12 MPa, preferably a pressure of less than about 30 MPa, e.g. less than 26 or 22 MPa, preferably the in situ pressure of the deposit is between about 7.4 and 30 MPa, especially preferably between about 8 and 20 MPa or between about 10 and 15 MPa. Preferably the $CO_2$ is injected into a heavy hydrocarbon deposit at the same conditions (e.g. same temperature and/or pressure) throughout the extraction process.

Methods for determining the in situ conditions of a reservoir are known to the skilled person.

The $CO_2$ injection conditions have an effect on the recovery and quality of upgraded hydrocarbon. It has now been found that the pressure of the supercritical $CO_2$ in step (i) of the process according to the invention is a particularly critical parameter. At a given temperature, use of higher pressures will make the $CO_2$ more dense and this is able to cut deeper into the heavier part of the crude. This finding allows for an unexpected tunability of the process of the invention. Use of the pressures described above, particularly when the temperature is around the critical temperature, facilitates the control of the process and especially the control of the final product quality of the two fractions (i.e. the upgraded hydrocarbon "product" and the heavier "residue" which is left in the reservoir). The composition of the extracted hydrocarbon mixture can thus be optimised for marketability, market value, feedstock value etc.

For a given temperature, when a lower pressure is used, the density of $CO_2$ is reduced and less hydrocarbon is generally extracted into the $CO_2$ stream. Thus generally it is advantageous to use $CO_2$ at higher pressures (and correspondingly higher $CO_2$ densities). However, if too high a $CO_2$ pressure (and density) is used, the extracted hydrocarbon will contain an increased amount of asphaltenes and/or napthalenics which is undesirable. Additionally the $CO_2$ may cause the preciptiation of asphaltenes in the formation which in turn can block pore throats and reduce the permeability of the reservoir. This is clearly highly undesirable. Thus there exists a range of $CO_2$ pressure (and density) within which the greatest extent of desirable hydrocarbon upgrading occurs. This needs to be balanced against the total amount of extracted hydrocarbon obtained in the process. By controlling the density of the $CO_2$, typically by controlling its pressure and/or by choosing the depth from which the heavy hydrocarbon is extracted, control over the extent of upgrading carried out during the processes of the invention may be achieved.

In a preferred embodiment of the invention, the temperature of the injected $CO_2$ is more than about 25° C., e.g. more than about 31° C., and less than 100° C., e.g. less than about 50° C. or less than about 40° C. Preferably, the temperature of the injected $CO_2$ is between about 25° C. and 100° C., especially between about 28° C. and 50° C. and particularly between about 31° C. and 41° C. The use of a temperature just below, at or slightly above the critical temperature results in a recovered, upgraded hydrocarbon having optimal properties, leaving the heavier and less desired fraction in the reservoir, and also in an optimal yield of hydrocarbon product.

In a further preferred embodiment, the pressure of the injected $CO_2$ is between about 0.1 and 50 MPa, especially between about 7.4 and 30 MPa and particularly between about 10 and 25 MPa. Especially preferred are conditions where the injected supercritical $CO_2$ is at a temperature of between about 31° C. and 100° C. and at a pressure of between about 10 MPa and 30 MPa.

As will be appreciated by the skilled person, the injection pressure of the supercritical $CO_2$ should generally be below the fracture pressure of the reservoir cap.

The process of the invention may be carried out using conventional equipment and wells. The $CO_2$ may be injected into the deposit via any bore hole. Preferably the $CO_2$ is injected into a deposit via an injection well, particularly a vertical injection well. Similarly the stream of $CO_2$ containing hydrocarbon may be removed from the deposit via any bore hole. Preferably the stream of $CO_2$ containing hydrocarbon is removed from the deposit via a production well. Injection and production wells used for hydrocarbon production may be used, i.e. the processes of the invention do not require the wells to be prepared in any particular fashion.

The $CO_2$ is preferably injected into the deposit using pumps, i.e. pumps conventional in the art. A compressor unit is preferably fluidly linked to the pump. The compressor is used to convert $CO_2$ into the near-supercritical state or supercritical state. As previously mentioned the $CO_2$ used in the process may be commercially available $CO_2$, $CO_2$ brought up from the subsurface (i.e. from $CO_2$ storage) or $CO_2$ emerging from the deposit, e.g. via a production well. Preferably at least some $CO_2$ is recycled $CO_2$.

The process of the invention is preferably used to extract and upgrade hydrocarbon accumulations from deeper reservoirs, preferably those which possesses insufficient geological stability to utilise the high pressure, high temperature conditions required for hot flooding. In particular, deep reservoirs are those wherein a majority of hydrocarbon (e.g. more than 80%) is situated at a depth of more than about 1000 m, especially more than about 1200 m below the surface, e.g. the surface of the sea.

In an especially preferred embodiment, the process of the invention is performed to extract hydrocarbon from a submarine reservoir, particularly from a submarine reservoir that can only be accessed by an off-shore extraction facility.

Since, at a given temperature, it has been found that the pressure controls the depth of the cut into the parent crude oil, a lower pressure will preferentially extract the lighter parts of the heavy hydrocarbon mixture. With increasing pressure, the $CO_2$ will cut deeper into the parent crude oil and a "fuller" range as to refinery yield structure will result. In order to improve the recovery as to amount of oil relative to the accumulated hydrocarbon in the reservoir over time, the operator may seek to optimise the in situ conditions (e.g. through modulation of the injection conditions) so as to continuously produce a marketable quality of extracted hydrocarbon relative to the parent heavy hydrocarbon accumulation. In such a process, the pressure at which the $CO_2$ is injected into the deposit is preferably modified to enable the optimisation of the extracted hydrocarbon.

In a further aspect, the invention therefore provides a method of optimising production of hydrocarbon from a heavy hydrocarbon deposit, said method comprising monitoring a process according to the invention wherein heavy hydrocarbon mixture is simultaneously extracted and upgraded by altering the injection conditions of $CO_2$ into said deposit and/or altering the depth from which the heavy hydrocarbon is extracted such that the characteristics (e.g. the API gravity) of the hydrocarbon produced is kept as constant as possible. The characteristics of the extracted hydrocarbon mixture may, for example, be monitored by gas chromatography. Monitoring may be carried out intermittently or continuously.

In one embodiment, the injection conditions are altered such that the temperature is gradually lowered over time. In a second embodiment the pressure is gradually lowered over time. In a preferred embodiment both the temperature and pressure are gradually lowered over time. In other cases, the injection conditions are maintained constant. In this latter case, the depth from which the heavy hydrocarbon is extracted may be gradually decreased or increased, preferably increased, over time. The injection conditions preferably remain within the limits hereinbefore defined.

In a related aspect of the invention, a process for producing an upgraded hydrocarbon product is contemplated, said process comprising the process for extracting and partially upgrading a heavy hydrocarbon mixture as described herein and further comprising the step of separating the upgraded hydrocarbon product from the $CO_2$ stream. The upgraded hydrocarbon product may be further refined or upgraded before transport (e.g. by pipeline). Preferably, the upgraded hydrocarbon product is a pumpable crude oil, especially one that can be transported by pipeline, e.g. to a conventional refinery for production of typical marketable retail products such as gasoline, diesel and jet-kerosene.

In one embodiment, the upgraded hydrocarbon product is separated from the $CO_2$ stream in a single fractionation, preferably in essentially a single fraction, e.g. by a reduction in the pressure and/or by a change in the temperature of said stream. An advantage of the process of the present invention is that in many cases the $CO_2$ emerging from the well is not in the supercritical state and thus is easily separated from the extracted hydrocarbon mixture. Preferably the $CO_2$ comprising extracted hydrocarbon and arriving back at the surface is not in a supercritical state.

The extracted and/or upgraded hydrocarbon product of the invention comprises a large proportion of middle distillate, e.g. at least 45% by weight of the product is kerosene, light gas oil and heavy gas oil. Preferably, the upgraded hydrocarbon product comprises at least 50% by weight, especially at least 60%, 70%, 80% or 90% by weight, of middle distillate. The upgraded hydrocarbon product preferably comprises at least 10% by weight of kerosene, e.g. at least 15% or at least 20% by weight. The upgraded hydrocarbon product also preferably comprises at least 35% by weight of light gas oil, e.g. at least 40%, 45% or 50% by weight.

Furthermore, the extracted and/or upgraded hydrocarbon product of the invention comprises a small proportion of atmospheric residue, i.e. little of the extra heavy fraction, e.g. less than 45% by weight of the product is vacuum gas oil and vacuum residue. Preferably, the upgraded hydrocarbon product comprises less than 40% by weight, especially less than 35% by weight, of atmospheric residue. The upgraded hydrocarbon product preferably comprises less than 15% by weight of vacuum residue, e.g. less than 10% or less than 5% by weight.

By "kerosene" is meant a hydrocarbon fraction having a boiling point between about 180° C. and 240° C.; by "light gas oil" is meant a hydrocarbon fraction having a boiling point between about 240° C. and 320° C.; and by "heavy gas oil" is meant a hydrocarbon fraction having a boiling point between 320° C. and 375° C. By "vacuum gas oil" is meant a hydrocarbon fraction having a boiling point between about 375° C. and 525° C.; and by "vacuum residue" is meant a hydrocarbon fraction having a boiling point of greater than about 525° C.

One advantage of the extraction and upgrading process of the invention is that the recovered hydrocarbon has a lower level of contaminants than the parent heavy hydrocarbon mixture. Accordingly, in one embodiment, the upgraded hydrocarbon product of the invention preferably has a sulphur content of less than 50% of that of the parent heavy hydrocarbon mixture. For example, the upgraded hydrocarbon product of the invention may comprise less than 4%, preferably less than 3% and especially preferably less than 2.5% by weight of sulphur. In a further embodiment, the upgraded hydrocarbon product of the invention preferably has an aromatics (e.g. asphaltene and/or naphthenic) content of less than that of the parent heavy hydrocarbon mixture, more preferably at least 10% less than that of the parent heavy hydrocarbon mixture, still more preferably at least 20% less than that of the parent heavy hydrocarbon mixture.

The upgraded hydrocarbon product of the invention preferably has an API gravity of at least about 5 degrees higher than that of the parent heavy hydrocarbon mixture, e.g. an API gravity of at least about 8, 12, 15 or 18 degrees higher. In a preferred embodiment, the extracted hydrocarbon mixture has an API gravity of greater than 20, e.g. greater than 25 or 30, e.g. up to about 35. Preferred upgraded hydrocarbon products have an API gravity of about 25, about 30 or about 33 degrees.

In an alternative embodiment, the upgraded hydrocarbon product is separated from the $CO_2$ stream in a plurality of fractions. Separation into a plurality of fractions advantageously allows a further refining stage to fine-tune the properties of the pumpable crude oil. The fractionated separation of the oil from the $CO_2$ stream can be effected solely by pressure reduction (e.g. stepwise reduction) of the $CO_2$ stream, or solely by changes in temperature (e.g. stepwise reduction or increase) of the $CO_2$ stream, or simultaneously effecting a pressure reduction and change in temperature of the $CO_2$ stream. The separation can be achieved by passing the $CO_2$ stream in succession through fractionating devices, the design of which would be apparent to the skilled person. During the separation, the compounds having a high molecular weight are precipitated first, followed by the compounds having a lower molecular weight. If the separation of the fractions is effected by an increase in temperature, care must be taken that temperatures are avoided at which individual petroleum components are cracked unless this is a desired outcome of the fractionation process. Several fractions may then be further processed and/or recombined to provide a final hydrocarbon mixture (e.g. a pumpable crude oil) with the desired properties, e.g. an API gravity of greater than 25, preferably of greater than 30, e.g. from 30 to 40 degrees.

In a further aspect therefore, the invention provides an upgraded hydrocarbon product, such as a pumpable crude oil, producible (e.g. produced) by a process as defined herein. In particular, the upgraded hydrocarbon product of the invention is characterised by a significantly lower viscosity and a lighter colour (e.g. light brown to yellow in colour) than that of the parent heavy hydrocarbon mixture.

The upgraded hydrocarbon product of the invention preferably has the characteristics described above. The upgraded hydrocarbon product of the invention preferably has an improved (i.e. reduced) carbon/hydrogen ratio, e.g. as shown by an increased proportion of saturated hydrocarbons relative to aromatic hydrocarbons and in particular to the heteroatom-containing (e.g. N, O or S containing) fraction of the product.

In a yet further aspect, the invention provides an apparatus adapted for use in a process as described herein. The apparatus of the invention comprises conventional components used for handling, pressurising and storing $CO_2$, as well as components for receiving, extracting and processing the recovered hydrocarbon fraction, etc. Such apparatus would be within the means of the skilled person to construct and operate.

A still further aspect of the invention contemplates the use of supercritical or near supercritical $CO_2$ in a process as described herein, e.g. in a process for simultaneously extracting or producing and upgrading a heavy hydrocarbon mixture, e.g. a heavy to extra heavy mixture, in situ.

The invention will now be further described with reference to the following non-limiting Figures and Examples, wherein.

In the figure legends: "VRES" denotes vacuum residue; "VGO" denotes vacuum gas oil; "ARES" and "Atm. Resid" denote atmospheric residue, i.e. VRES and VGO; "HGO" denotes heavy gas oil; "LGO" denotes light gas oil; "KERO" denotes kerosene; "HVN" denotes heavy virgin naphtha (having a boiling point of between 90° C. and 180° C.); and "LVN" denotes light virgin naphtha (having a boiling point of between 5° C. and 90° C.). The terms "SATS", "ARO" and "Polars" respectively denote saturates, aromatics and polar components.

EXAMPLE 1

Core Flooding with Supercritical $CO_2$

Figure 1:
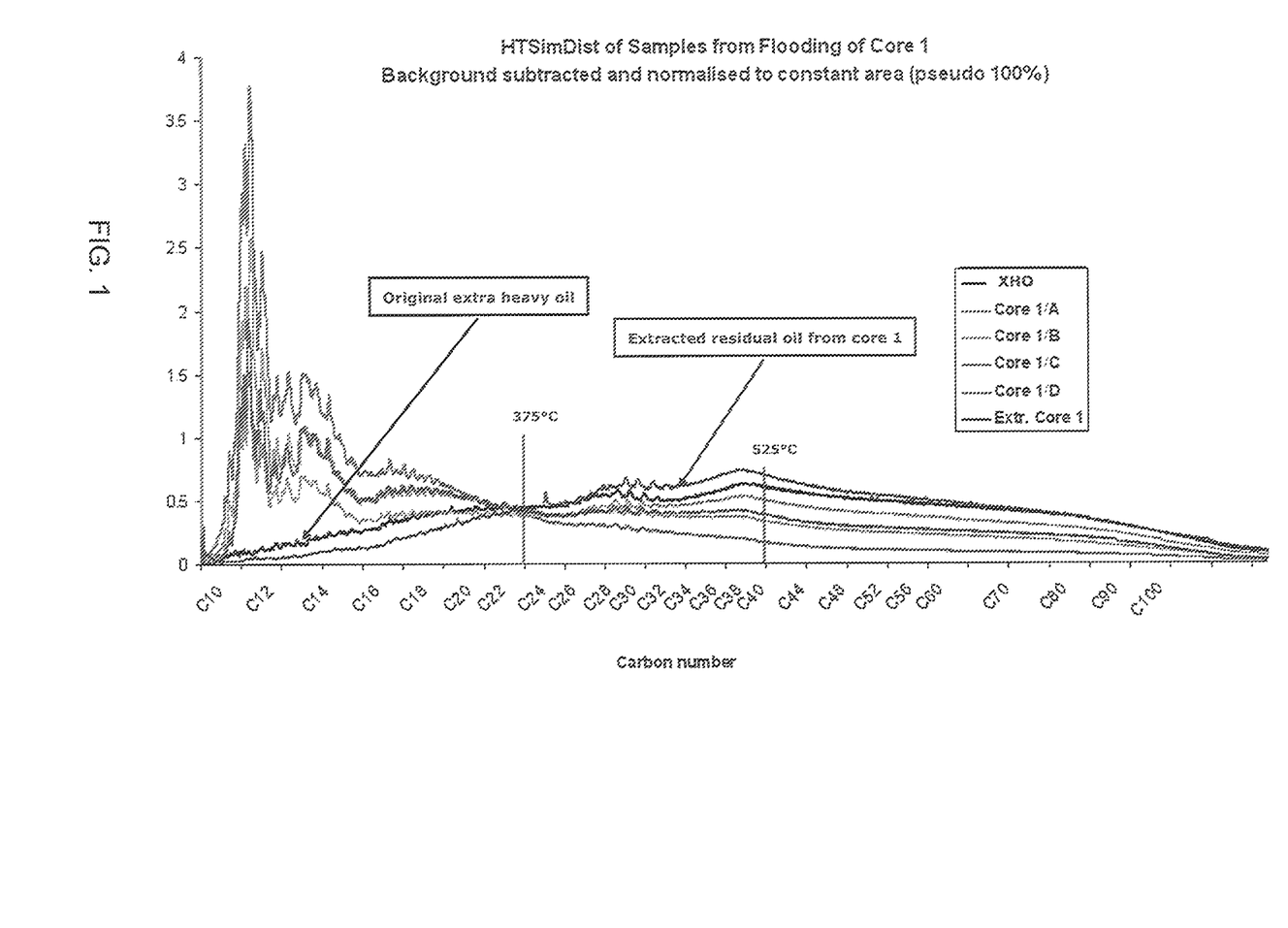
FIG. 1 shows the results of a core flooding experiment which illustrate the selective extractability of supercritical $CO_2$ at constant temperature. The improved quality of the produced oil is manifested through increased yield of components up to a boiling point of about 375° C. ($C_{2-24}$ hydrocarbons) and a strong reduction in the yield of components above 375° C.

The experiments were carried out in a core flooding apparatus under controlled temperature and pore pressure conditions. The porous medium used was typical Bentheimer sandstone core plugs saturated with an extra heavy oil, and the critical core plug characteristics were as follows:

Bulk volume: 53-79 cm$^3$
Pore volume: 12-17 cm$^3$
Porosity: 21-24%
Permeability: 951-2846 mD The flooding rate was 0.5 ml/min The oil used in the experiments was an extra heavy oil with an API gravity of <10°. The experiment was carried out within a few hours and the results are shown in FIG. 1, which is an HTSimDist chromatogram of recovered samples from the core flooding experiment. Background has been subtracted and data normalised to constant area (pseudo 100%).

The line Core 1/A shows the chromatogram of the first flood with $CO_2$, the line Core 1/B shows the chromatogram of the second flood with $CO_2$ and so on. The line XHO shows the chromatogram of the extra heavy oil used in the experiment. The line Extr. Core 1 shows the chromatogram of the residual oil left in the core after the flooding experiments.

It can be easily seen from FIG. 1 that the process of the invention achieves upgrading of the heavy oil during the extraction process. This can be see, for example, by comparing the chromatograms of XHO and Extr.1 Core. The chromatogram for Extra. 1 Core contains a lower amount of lighter hydrocarbons and an increased amount of heavier hydrocarbons relative to the chromatogram for XHO. This is because the $CO_2$ floods have extracted more lighter hydrocarbons than heavy hydrocarbons. This result correlates with the chromatograms for each of Core floods 1/A to 1/D which show that the main component extracted are lighter hydrocarbons.

Figure 2:
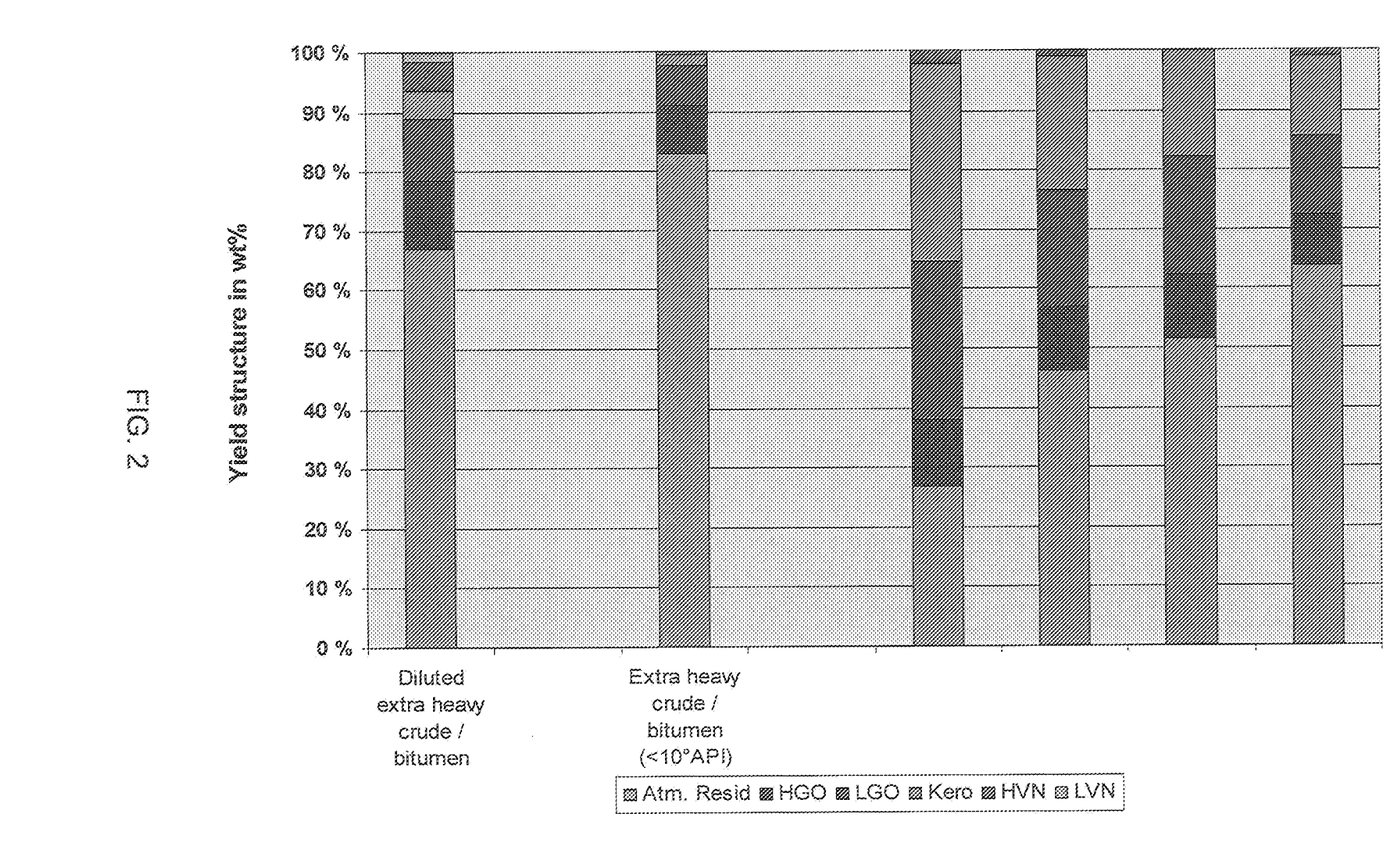
FIG. 2 shows exemplified refinery yield structure alternatives. The original extra heavy oil (second bar) is diluted to pipeline specifications (left) and is in situ upgraded to variable degrees through core flooding with supercritical $CO_2$ (right)

FIG. 2 exemplifies a refinery yield structure of the original extra heavy oil in the centre vs. the refinery yield structures after conventional dilution to pipeline specifications (left) and variable degrees of in situ upgrading through core flooding with supercritical $CO_2$ (right), respectively. The 4 refinery structures shown to the right of the "Extra Heavy crude/bitumen" structure correspond to the hydrocarbon structures obtained in core flooding experiments 1/A-1/D respectively.

EXAMPLE 2

Supercritical $CO_2$ Extractions

Experiments were carried out with different crude oils in a closed stainless steel cell under temperature and pressure control. The cell was equipped with valves to recover the lower oil phase and an upper $CO_2$-phase, and a window in the cell made it possible to see the two phases and the boundary between them.

Crude oils having API gravities of 19° and 25° were contacted with $CO_2$ in the pressure cell and the upper ($CO_2$) and the lower (crude oil) phases could be sampled for compositional analyses, densities and viscosities. Temperature and pressure conditions employed were
  a) Temperature of 28° C., pressure of 7.4 MPa;
  b) Temperature of 35° C., pressure of 8.0 MPa;
  c) Temperature of 35° C., pressure of 12 MPa; and
  d) Temperature of 28° C., pressure of 12 MPa.

Figure 3:
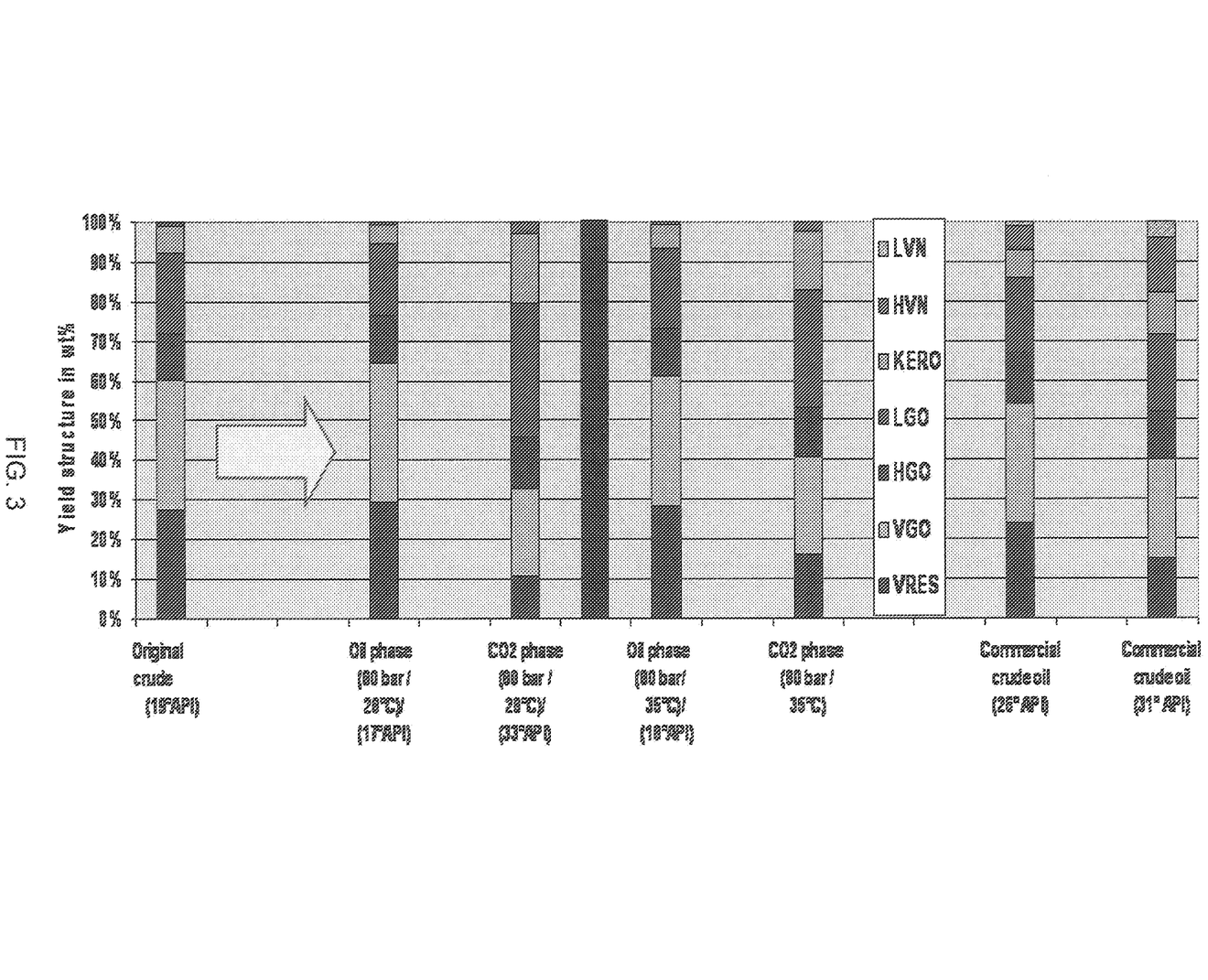
FIG. 3 shows the results of contact experiments with a 19° API crude oil (left) under different conditions and a comparison with commercial 26° and 31° API crude oils.
Figure 4:
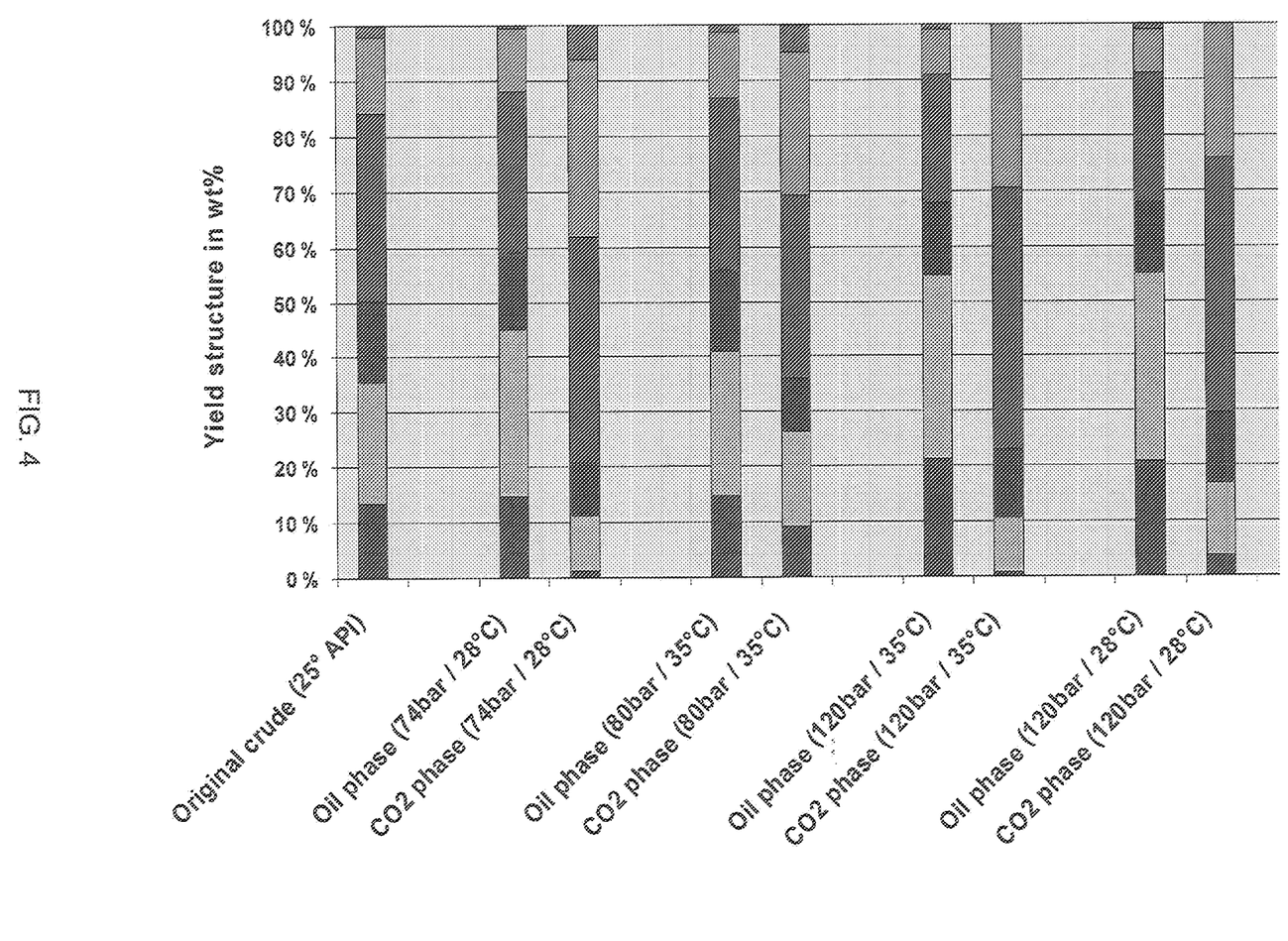
FIG. 4 shows the results of contact experiments with a 25° API crude oil under different conditions.

The experiments were carried out within a few hours and the results, shown in FIGS. 3 and 4, demonstrate that extraction with supercritical $CO_2$ at relatively low temperatures and pressures allows for selective upgrading of the yield structure.

EXAMPLE 3

Slimtube Experiments

The experiments were carried out in a typical slimtube made of Hastelloy C. The slimtube, packed with glass beads, had the following characteristics:

Column length: 1830 cm
Bulk volume: 380 ml
Pore volume: 137 ml
Porosity: 36%
Permeability: 4478 mD During the experiments the product could be constantly sampled (collected and weighed) before analysis by HTSimDist (simulated distillation for refinery yield structure), Iatroscan (for saturates, aromatics and polar components) and an element analyzer (for C, H, S and N according to ASTM D-5291 and D-5762). Sulphur (ASTM D-4294) and density (ASTM D-4052/5002) could also be analysed.

Figure 5:
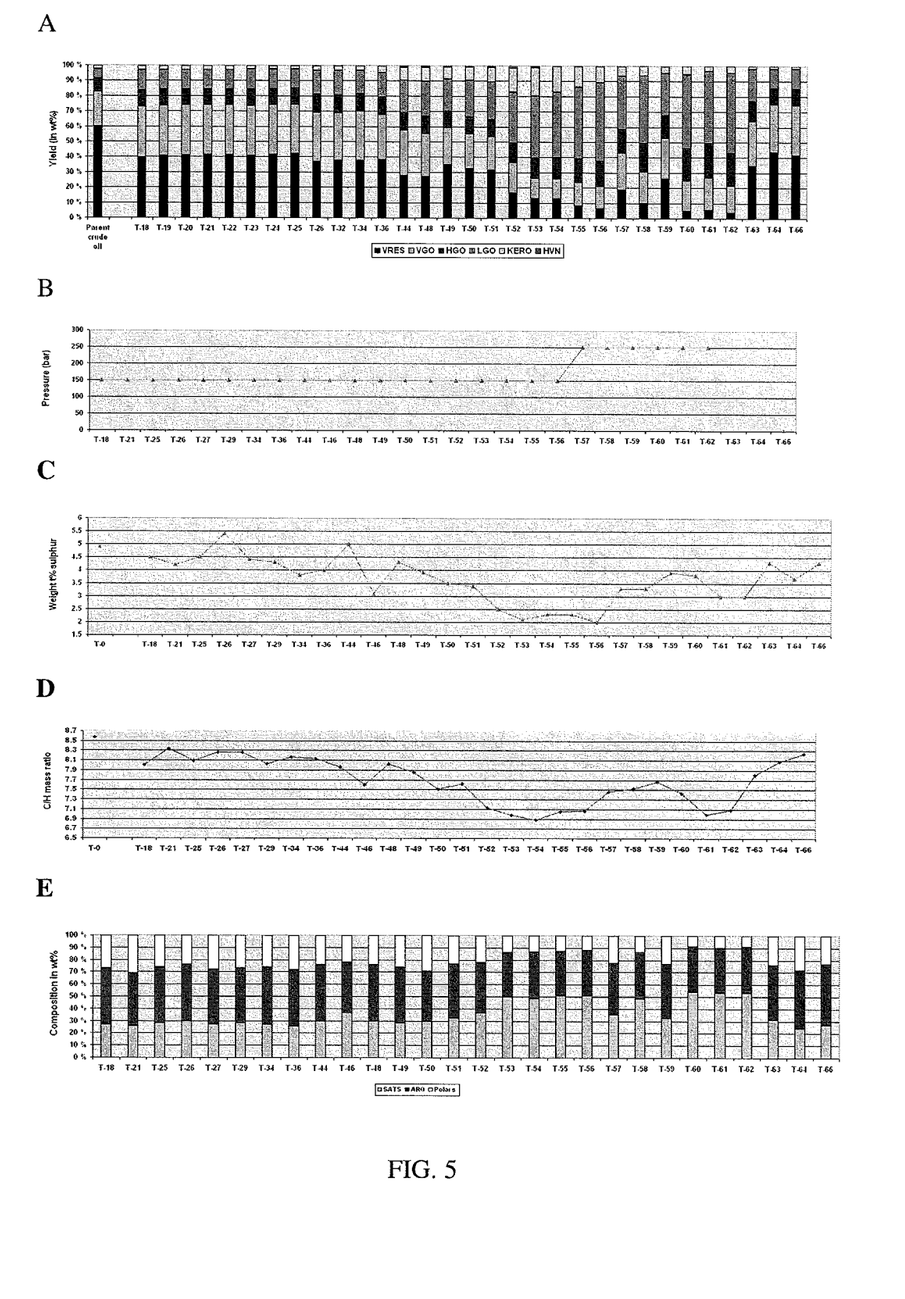
FIG. 5 shows the results of slimtube experiments with an extra heavy oil (<10° API) under controlled temperature and pressure conditions, where (A) shows tentative refinery yield structures; (B) shows pressure changes; (C) shows weight percent of sulphur; (D) shows the C/H mass ratio; and (E) shows the sample composition by latroscan across the sample tubes.

An extra heavy crude oil/bitumen quality hydrocarbon (<10° API) was extracted at 50° C. employing a pressure at 15 MPa in a long-time slimtube experiment with supercritical $CO_2$ as the mobile phase. At the end of the experiment the pressure was increased to 25 MPa. The following results were observed (see also FIG. 5):

In the first part of the experiment (50° C. and 15 MPa pressure) the produced hydrocarbon quality became gradually richer in the middle distillate fractions (kerosine, light and heavy gas oils), from 15-20 wt % at the start, up to 75-80 wt % at the end of this period, whilst the atmospheric residue (vacuum gas oil and vacuum residue) at the same time was gradually reduced from around 80 wt % at the start to about 20 wt % at the end. The change in quality of the produced hydrocarbon is postulated to be due to moving from a push to a real extraction of the extra heavy crude oil/bitumen in the slimtube.

The ratio between carbon and hydrogen was during this period gradually reduced from approximately 8.7 in the parent hydrocarbon mixture to about 6.9-7.0 at the end of the 150 bar pressure period, i.e. the degree of hydrogen saturation was gradually increased in the recovered product compared to the parent hydrocarbon mixture. The product also showed a decreasing trend as to sulphur-containing components in the product, going from approx 5 wt % sulphur in the parent hydrocarbon mixture to an average of about 2.2 wt % sulphur in the extracted product at the end of the same pressure period. SARA analyses (saturates, aromatics, resins and asphaltenes) were also performed on the sampled product batches, showing that the saturate/aromatic/polar fraction composition changed from 27/46/27 to 51/37/12 over this phase of the experiment. The results support a selective recovery of good quality components in the products obtained by supercritical extraction of a extra heavy crude oil/bitumen sample, and the very best results were obtained when there was a good contact between the parent hydrocarbon mixture and the supercritical $CO_2$ phase.

When the pressure was increased to 25 MPa, the $CO_2$ became denser and started to cut deeper into the parent crude oil, resulting in a heavier refinery yield structure. Here, the atmospheric (long) residue increased again to an average of about 70 wt %, whilst the level of sulphur reached approximately 4 wt %. The relative composition as to saturated, aromatic and polar components reverted to a ratio closer to that of the parent hydrocarbon mixture whilst the carbon/hydrogen ratio reached a level of 8.3. (Note the injection of $CO_2$ was temporarily halted when T-60-T-62 were obtained. This is why these results do not show the same trend as the remainder of the results).

The degree of upgrading achieved provides a better refinery yield than conventional dilution of the extra heavy fraction.

It can thus be concluded that an extra heavy crude oil/bitumen can be extracted with supercritical $CO_2$ at 50° C. with pressures between 15 and 25 MPa, yielding a high value, pumpable product.

The invention claimed is:

1. A process for simultaneously extracting and upgrading by controlled extraction a heavy hydrocarbon mixture, said process comprising:
   i) injecting supercritical or near-supercritical $CO_2$, in the absence of $H_2$, at a temperature of around the critical temperature and a pressure of around the critical pressure into an initial heavy hydrocarbon deposit;
   ii) removing a stream of $CO_2$ from the deposit, said stream being charged with a recovered hydrocarbon mixture, which is separated from said initial heavy hydrocarbon deposit, having a lower average molecular weight than that of the initial heavy hydrocarbon deposit and leaving a residual hydrocarbon mixture in said deposit having a higher average molecular weight than that of the initial heavy hydrocarbon deposit; and
   iii) separating the recovered hydrocarbon mixture from the $CO_2$ stream,
   wherein said recovered hydrocarbon mixture is separated in essentially a single fraction, and
   wherein the removed $CO_2$ is optionally recovered and either recycled for subsequent re-injection or injected for long-term sub-surface storage.

2. The process of claim 1, wherein said initial heavy hydrocarbon deposit is a submarine deposit and wherein the injection site for said supercritical $CO_2$ is an off-shore injection site.

3. The process of claim 1, wherein the initial heavy hydrocarbon mixture has an API gravity of between about 8 and about 25 degrees.

4. The process of claim 1, wherein the $CO_2$ is injected at a temperature of between about 25 and about 100° C.

5. The process of claim 1, wherein the supercritical $CO_2$ is injected at a pressure of between 7.4 and 30 MPa.

6. The process of claim 1, wherein said recovered hydrocarbon mixture contains an increased proportion of $C_{2-24}$ hydrocarbons and a decreased proportion of $C_{25+}$ hydrocarbons relative to the initial heavy hydrocarbon deposit.

7. The process of claim 1 wherein the upgraded hydrocarbon product is a pumpable crude oil having an API gravity of greater than 25 degrees.

8. A method of optimising production of hydrocarbon from a heavy hydrocarbon deposit, said method comprising monitoring a process as claimed in claim 1 and altering the injection conditions of $CO_2$ into said deposit and/or altering the depth from which the heavy hydrocarbon is extracted such that the characteristics of the hydrocarbon produced is kept as constant as possible.

9. A pumpable crude oil producible by a process as claimed in claim 1.

10. The process of claim 4, wherein the $CO_2$ is injected at a temperature of greater than 25° C. and less than 40° C.

11. The process of claim 5, wherein the $CO_2$ is injected at a pressure of between 10 and 25 mPa.

12. The process of claim 1, wherein in situ conditions of said deposit are a temperature of between 25° C. and 120° C. and a pressure of between 7.4 and 30 mPa.

* * * * *